Sept. 20, 1966 R. W. PINNES 3,273,654
MOVABLE TURBINE-FAN UNIT FOR AN AIRCRAFT JET ENGINE
Filed June 18, 1965 2 Sheets-Sheet 1
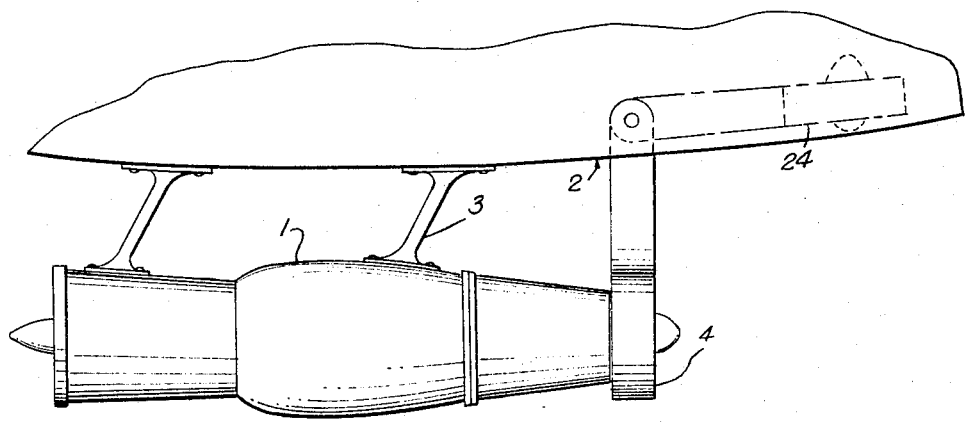
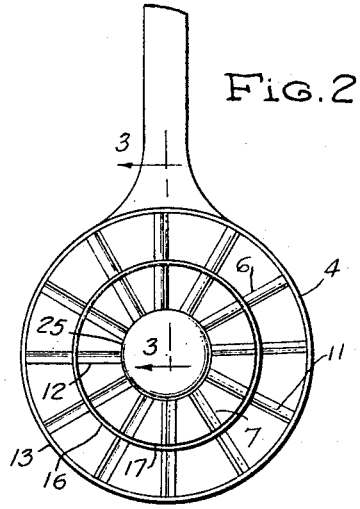
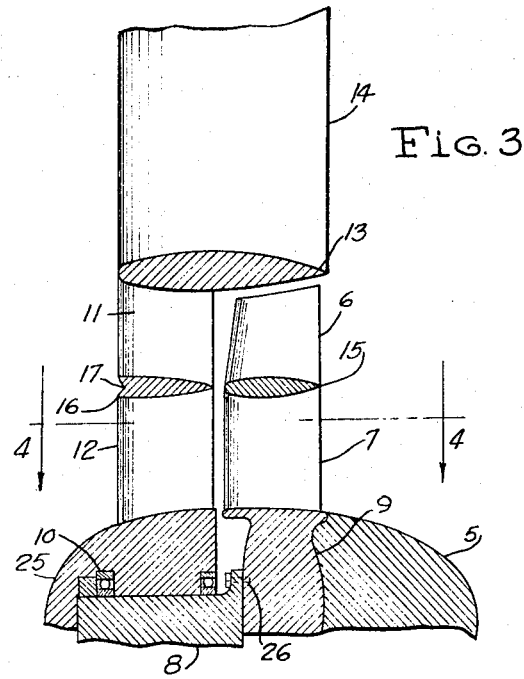
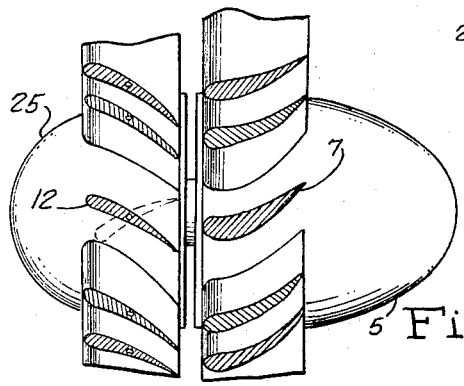
INVENTOR
ROBERT W. PINNES
BY *Joseph A. Hill*
ATTORNEY Sept. 20, 1966  R. W. PINNES  3,273,654
MOVABLE TURBINE-FAN UNIT FOR AN AIRCRAFT JET ENGINE
Filed June 18, 1965  2 Sheets-Sheet 2

INVENTOR
ROBERT W. PINNES
BY Joseph A. Hill
ATTORNEY

United States Patent Office
3,273,654
Patented Sept. 20, 1966

3,273,654
MOVABLE TURBINE-FAN UNIT FOR AN
AIRCRAFT JET ENGINE
Robert W. Pinnes, Rockville, Md., assignor to the United
States of America as represented by the Secretary of
the Army; and/or the Administrator of the Federal
Aviation Agency
Filed June 18, 1965, Ser. No. 465,218
10 Claims. (Cl. 170—135.7)

The invention described herein may be manufactured and used by or for the Government for governmental purposes without the payment to me of any royalty thereon.

This invention relates to a modification of a high-performance, high-speed aircraft turbo jet engine and more particularly to a modification which will be used to obtain good performance characteristics at low aircraft speeds, but which will not affect the engine's normal high-speed performance.

The United States Government and private industry are currently jointly developing a supersonic, high-altitude, transport aircraft for use on intercontinental and other long range passenger flights. The desired characteristics of such an aircraft would include short runway distance for take-off and landing, good slow speed characteristics, good transonic and supersonic speed characteristics, long range, and a low noise level for operation over densely populated areas. At the present time, there is no aircraft capable of fulfilling all of these requirements. All known aircraft are either low speed or high speed oriented and are generally not capable of good performance in the other environments. The present invention is a modification of a high-performance, high-speed aircraft engine which will fill this void and will enable a single aircraft engine to give good performances at both high and low speeds.

An object of this invention is to provide large take-off thrust along with good transonic and supersonic thrust.

Another object of this invention is to provide both good low speed and supersonic specific fuel consumption.

It is a further object of this invention to provide a low take-off and landing noise level.

It is still a further object of this invention to provide thrust reversal during the aircraft's landing stage.

Other objects and many of the attendant advantages of the present invention will become more fully apparent upon consideration of the following detailed specification, in connection with the accompanying drawings wherein:

FIG. 1 is a side elevation showing the present invention in an operating position in register with a jet engine;

FIG. 2 is a frontal view of the present invention;

FIG. 3 is a sectional view taken along line 3—3 of FIG. 2;

FIG. 4 is a sectional view taken along line 4—4 of FIG. 3 showing one embodiment of the present invention which enables a thrust reversal to be obtained during landing;

Figure 5:
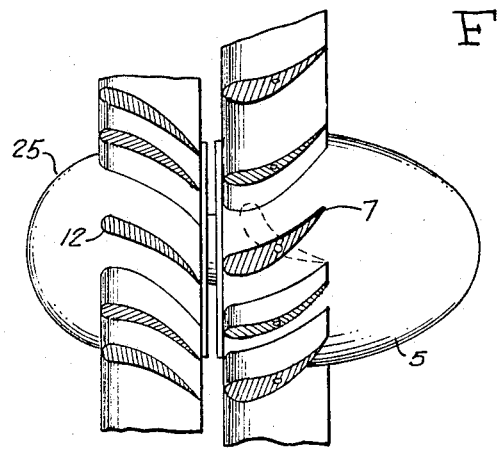
FIG. 5 is another embodiment of the present invention viewed along the same lines as FIG. 4 and shows an alternative method for obtaining a thrust reversal.

Referring now more specifically to the drawings wherein like numerals indicate like parts throughout the several views, there is shown at 1 in FIG. 1 a turbo jet engine which is supported from the airplane fuselage by a strut 3. The movable turbine-fan unit of the present invention is shown in its operational position at 4. The dotted lines 24 show the movable fan unit generally in its stowed position.

FIGS. 2 and 3 show generally the main structural components of the movable turbine-fan unit. This unit comprises turbine blades 7, circularly inclosed with ring 15, and fan blades 6 mounted on said ring 15 and radially disposed thereon. The turbine blades 7, in turn, are mounted on hub 9 which is encased in a housing 5. The hub 9 is rigidly mounted at 26 to an axle 8 and this axle is mounted for rotation in housing 25. Mounted on housing 25 are stator vanes 11 and 12. These are separated by a ring 16, having a depression 17 in the front edge thereof for engagement with the rear of the engine nacelle. The whole unit is enclosed in a ring 13 for streamlining effect and is suspended from a frame member 14. The movable unit itself is relatively flat with a short axial length. This enables the unit to be stowed relatively simply in the aircraft in a minimum amount of space.

The unit can be rotated about a pivot from its operational position to its stowed position, as shown in FIG. 1, by a conventional power means. Although this arrangement has the benefit of simplicity, it has the disadvantage of producing vertical thrust components during the transition from an operational position to a stowed position. These components can be minimized however, by throttling the engine back during transition. The overall thrust level of the airplane can be kept constant by the other engine.

Figure 6:
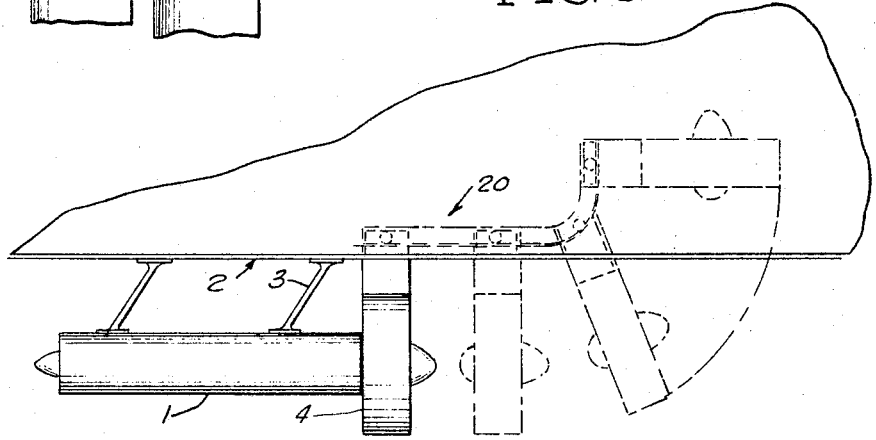
FIG. 6 is a side elevation of another embodiment of the present invention and shows how the invention moves from its operating to its stowed position.

Instead of cutting back the engine, the track embodiment shown in FIG. 6 could be used to reduce these vertical thrust components. Here the fan unit is moved axially in the region of the turbo-jet exhaust and when it is far enough removed from the exhaust so that the exhaust is diffused somewhat (and hence the vertical components reduced), the unit is moved up into the aircraft.

Figure 7:
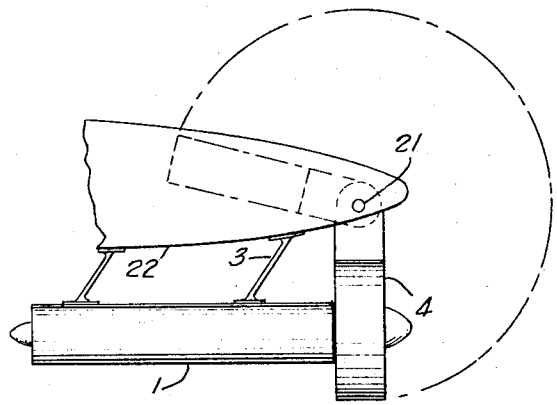
FIG. 7 is another embodiment of the present invention showing how the invention moves from its operating to its stowed position.

FIG. 7 shows another embodiment of the invention for use when the aircraft structure is not sufficient aft of the basic turbo-jet engine to permit the movable turbine-fan unit to be stowed in the manner shown in FIG. 1 and FIG. 6. This embodiment can also be used where the basic turbo-jet engine is suspended from the wing of an airplane, instead of from the fuselage. Here the turbine-fan unit 4 is mounted on a pivot 21 in wing 22. The unit is moved from its operational position in a circular motion over the top of the wing or fuselage into a stowed position on top of said wing or fuselage.

It should be realized that the power means for moving the unit into and out of its operational position is conventional and is not specifically a part of this invention.

The turbine-fan unit is also capable of thrust reversal during the aircraft's landing. This may be accomplished as shown either in FIG. 4 or in FIG. 5. In FIG. 4 the turbine stator vanes 12 are rotated, by any conventional means, to a position that will cause the turbine to rotate in a direction opposite to that of normal operation. This opposite rotation will cause the fan to push air forward, thus creating a reverse thrust. It should be noted that this reversal will greatly lower the efficiency of the operation, but its duration will be sufficiently short so that the effect on fuel requirements will be minor. The thrust reversing method disclosed is an improvement over the present approaches since ambient air (with some small contamination from the exhaust gases) is pushed forward. This is preferable to directing hot exhaust gases forward because the colder air eliminates aircraft structural problems and permits an axisymmetric reverse thrust flow pattern.

The reverse thrust method of FIG. 4 requires that the turbine be reversed. If it is desired to obtain reverse thrust without changing the direction of rotation, the method disclosed in FIG. 5 may be used. Here the fan and turbine blades are rotated by conventional means, separately or as a unit, to the reverse thrust position shown by the dotted lines. During this operation, care must be exercised to insure that the wheel is not overspeeded anywhere in this cycle.

It should be noted that in either of the reverse thrust methods shown, the fan unit is tending to pull away from the engine. Therefore, the frame member 14 and the moving mechanisms shown in FIGS. 1, 5 and 6 must be sufficiently strong to carry this additional thrust and a locking means will be required to hold the unit against the nacelle.

*Operation*

The movable unit is brought into register with the rear of the turbo-jet engine nacelle so that the exhaust gases from the engine pass through the turbine of the unit. The turbine absorbs energy from the exhaust gases and, in turn, discharges these gases with a significantly lower velocity to the rear of the movable unit. The power absorbed by the turbine is used to turn the movable turbine fan unit's fan which is designed to give optimum performance over a relatively small low speed range. The maximum diameter of the fan will, of course, be limited by the space available between the axis of the basic turbo-jet engine and the aircraft structure above it.

The fan unit would be in an operational position as shown in FIGS. 1, 6 or 7 during take-off, early acceleration and landing. In this position, the turbine-fan unit will operate essentially like the high by-pass ratio turbo-fan engines which are presently used in many of the commercial passenger airliners. These type engines give good low speed thrust and specific fuel consumption, but are incompatible with good supersonic characteristics. Therefore, at some flight speeds during take-off, perhaps Mach 0.6, the unit would be retracted to its stowed position 24. At this point, the engine would operate as a straight turbo-jet engine and hence, give good high speed thrust and specific fuel consumption. At the completion of the flight, preparatory to landing, the unit would again be moved to its operational position and the aircraft would be landed with the unit in that position. Thus in any single flight, the unit would be used and moved two times.

The operating speed of the unit will be determined by the characteristics of the exhaust gases of the turbo-jet engine, i.e., the power setting of the unit is established by operating the control system of the basic turbo-jet engine. It should be noted in this regard that the net thrust of the movable fan unit is forward. Thus, when the unit is operating, its force will be pushing against the engine nacelle and this thrust will be transmitted to the aircraft through the engine mounting 3 and increase the thrust available during take-off.

Also, it should be noted that when the unit is in its operational position, it will act as a noise suppressor. This feature of the invention will eliminate any additional weight penalty required for an additional noise suppressor.

Obviously, many modifications and variations of the present invention are possible in light of the above teachings.

I claim:
1. A movable turbine-fan unit comprising:
 (a) a turbine including rotor and stator blades;
 (b) a plurality of fan rotor blades fixedly mounted on said turbine for rotation therewith;
 (c) a plurality of fan stator blades longitudinally aligned with said turbine stator blades; and
 (d) means for moving said turbine into and out of register with the rear of a jet engine.

2. The device of claim 1 in which said turbine and fan stator blades are mounted so as to be rotatable about their longitudinal axes, said rotation being sufficient to change the pitch of said blades with respect to the axis of said jet engine.

3. The device of claim 1 in which the turbine and fan rotor blades are mounted so as to be rotatable about their longitudinal axes, said rotation being sufficient to change the pitch of said blades with respect to the axis of said jet engine.

4. The device of claim 1 in which said stator vanes are rotatable about their longitudinal axes, said rotation being sufficient to change the pitch of said vanes with respect to the axis of said jet engine.

5. The device of claim 1 in which the means for moving said turbine comprises:
 (a) a housing;
 (b) turbine stator vanes attached radially to said housing;
 (c) a ring enclosing said turbine stator vanes;
 (d) fan stator vanes mounted on the outside of said ring and being radially disposed thereon;
 (e) an outer ring enclosing said fan stator vanes;
 (f) a frame upon which said outer ring is attached; and
 (g) means for moving said frame toward and away from said jet engine.

6. The device of claim 5 wherein the means for moving said frame toward and away from said jet engine comprises:
 (a) a flanged beam parallelly disposed to the centerline of said jet engine;
 (b) rollers mounted on said frame, and rollable on said flanged beam; and
 (c) power means for moving said rollers along said flanged beam.

7. A movable turbine-fan unit comprising:
 (a) turbine rotor blades;
 (b) a circular ring attached to and inclosing the outer ends of said turbine rotor blades;
 (c) fan blades mounted on said ring and radially extending outwardly therefrom;
 (d) a hub upon which said turbine rotor blades are mounted;
 (e) an axle to which said hub is rigidly secured;
 (f) a housing surrounding said axle, said axle being rotatably mounted in said housing;
 (g) turbine stator vanes attached to said housing;
 (h) a second ring circularly attached to and inclosing said turbine stator vanes, said ring having a depression in the front edge thereof;
 (i) fan stator vanes attached to and extending radially outward from said second ring;
 (j) a third ring attached to and circularly inclosing said fan stator vanes;
 (k) a frame to which said third ring is attached, thereby supporting said rings, vanes, housing, axle, hub, turbine blades and fan blades; and
 (l) power means for moving said frame to a position where the said second ring is in locking register with a jet engine and for removing said frame and supported structure into and out of a stowed position in an aircraft.

8. The device of claim 7 in which the turbine and fan rotor blades are rotatable about their longitudinal axes, said rotation being sufficient to change the pitch of said blades with respect to the axis of said jet engine.

9. The device of claim 7 in which said turbine and fan stator vanes are rotatable about their longitudinal axes, said rotation being sufficient to change the pitch of said vanes with respect to the axis of said jet engine.

10. A movable turbine-fan unit comprising:
(a) a turbine;
(b) a plurality of fan blades fixedly mounted on said turbine for rotation therewith; and
(c) means for moving said turbine and fan blades from a position registering with a jet engine to a stowed position inside an aircraft.

References Cited by the Examiner

UNITED STATES PATENTS

| | | | |
|---|---|---|---|
| 1,809,271 | 6/1931 | Goddard | 60 |
| 2,397,999 | 4/1946 | Goddard | 60 |
| 2,866,610 | 12/1958 | Taylor | 244—52 |
| 3,013,751 | 12/1961 | Scott et al. | 244—110 |
| 3,134,561 | 5/1964 | Clejan | 244—58 |

MARTIN P. SCHWADRON, *Primary Examiner.*

E. A. POWELL, JR., *Assistant Examiner.*